United States Patent
Kelley et al.

(10) Patent No.: US 7,552,136 B2
(45) Date of Patent: Jun. 23, 2009

(54) CONTEXT MANAGEMENT SUPER TOOLS AND FILTER/SORT MODEL FOR AGGREGATED DISPLAY WEBPAGES

(75) Inventors: John Falk Kelley, New Milford, CT (US); Jason Thomas Yuen, Princeton Junction, NJ (US); Michael P. Heck, Carbondale, IL (US); Matthew D. Garay, Cincinnati, OH (US)

(73) Assignee: International Business Machines Corporation, Armonk, NY (US)

( * ) Notice: Subject to any disclaimer, the term of this patent is extended or adjusted under 35 U.S.C. 154(b) by 1166 days.

(21) Appl. No.: 10/001,744

(22) Filed: Oct. 31, 2001

(65) Prior Publication Data

US 2003/0084059 A1    May 1, 2003

(51) Int. Cl.
*G06F 17/30* (2006.01)
(52) U.S. Cl. ............................. 707/102; 707/3; 707/5; 715/771
(58) Field of Classification Search ................. 707/1, 707/3, 102, 10; 345/716, 854, 738, 739; 715/738
See application file for complete search history.

(56) References Cited

U.S. PATENT DOCUMENTS

| | | | |
|---|---|---|---|
| 5,339,392 A | 8/1994 | Risberg et al. | |
| 5,806,077 A * | 9/1998 | Wecker | 715/501.1 |
| 5,819,273 A * | 10/1998 | Vora et al. | 707/10 |
| 5,870,559 A | 2/1999 | Leshem et al. | 709/224 |
| 5,913,214 A * | 6/1999 | Madnick et al. | 707/10 |
| 6,081,829 A | 6/2000 | Sidana | 709/203 |
| 6,237,006 B1 | 5/2001 | Weinbert et al. | 707/103 R |
| 6,452,609 B1 * | 9/2002 | Katinsky et al. | 345/716 |
| 6,473,751 B1 * | 10/2002 | Nikolovska et al. | 707/3 |
| 6,640,249 B1 * | 10/2003 | Bowman-Amuah | 709/228 |

FOREIGN PATENT DOCUMENTS

| | | |
|---|---|---|
| JP | 07-98651 | 4/1995 |
| JP | 2002-230294 | 8/2002 |
| JP | 2002-259337 | 9/2002 |
| WO | WO 9212488 | 7/1992 |

\* cited by examiner

*Primary Examiner*—Cam Y T Truong
(74) *Attorney, Agent, or Firm*—Robert H. Frantz; David A. Mims, Jr.; William H. Steinberg

(57) ABSTRACT

An information aggregation and management system and method having selective "drill-down" capabilities and employing an Object-Action Navigation methodology. A user first selects an object of interest, and then selects one or more actions to perform on said selected object. An informational object may be selected from a Context Pane, and then an available action for that object may be selected from execution. A Content Pane displays the results of the actions on the object or objects. The user may rearrange, summarize, maximize, filter and sort information for display to effectively manage display area and minimize operations necessary to obtain information and analysis of interest.

6 Claims, 9 Drawing Sheets

CONTEXT MANAGEMENT SUPER TOOLS AND FILTER/SORT MODEL FOR AGGREGATED DISPLAY WEBPAGES

CROSS-REFFERENCE TO RELATED APPLICATIONS

Claiming Benefit Under 35 U.S.C. 120

Not applicable.

FEDERALLY SPONSORED RESEARCH AND DEVELOPMENT STATEMENT

Their invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This invention relates to the arts of data management, searching, and summarization tools for networked computers and databases, and especially to user interface technologies for web browsers.

2. Background of the Invention

High-demand users such as investors, purchasing agents, sales people, and technical support staff, perform constant research online, via the Internet and other proprietary data networks and datafeeds. Current methods of delivering the multiplicity of information needed by these users usually involves a less-than-intuitive and confusing array of windows, pop-up boxes, and drop-down lists.

For example, a professional trader's daily activities in a "trading room" includes accessing, monitoring and analyzing many sources of information through a variety of means such as terminals, computers, and telephone lines.

One such trading room is the educational and model trading room operated by Massachusetts Institute of Technology's (MIT) Sloan Trading Room. In this simulated trading room, student "traders" may observe "tick-by-tick" price-volume date from such data sources as Reuters, Bridge, and Bloomberg for over 300,000 financial instruments.

A trader may also watch "data walls", such as those operated by Trans-Lux, and the trader may use an IPC Tradenet telephone network as needed. Each trader also typically has access to a personal computer ("PC"). All of these devices are arranged on a trader desk or console where they can physically be monitored and operated by a trader throughout his or her work day.

So, through all of these means, a typical trader may try to monitor several datafeeds, such as Reuters and Bloomberg, as well as access databases of historical information regarding various financial instruments and companies, such as the Center for Research in Securities Prices (CRSP) at the University of Chicago, and Standard and Poor's Compustat. Further, the trader may have access to analysts reports, such as I/B/E/S, from his or her PC. The PC itself is usually equipped with analytical and charting software, such as Leading Market Technologies' EXPO data visualization and analysis package, for processing and analyzing "raw" data received from the datafeed services. Additionally, the trader may use the PC and a browser to "check" or visit various web sites for news and information throughout the day and while making investment decisions.

This environment, though, can be overwhelming to the trader due to the amount of simultaneously displayed information, some of which is displayed in text format such as analysts' remarks, news stories, and ticker updates, and some of which is displayed graphically, such as historical charts, index trends, etc. All of these forms of information usually use color coding for highlighting of information or indicating other conditions related to the information.

The web browser has taken the forefront as the main tool in recent years, as many of these sources of information have transitioned from originating from proprietary sources and technologies to being available via the Internet. While this has consolidated much of the information for access through a single instrument, the PC, it has increased the amount of manual operations necessary to "keep abreast" of the various sources of information, such as clicking and typing operations to jump from one web site to another.

Some "off the shelf" software packages have been developed to integrate and summarize some of this information into single screens of information. These, too, follow the user interface paradigm of a browser, typically, and usually do not allow for a great deal of customization as to the sources of information, priority of the updates, display arrangement, etc. Many such software packages have been adapted for non-professional use, such as use by "day traders".

The user interface paradigm typically is an "inverted-L" paradigm, wherein a user first selects a task or operation to be performed, such as selecting an analysis program to be run, and then must select an object on which to run the task, such as a block of data from a datafeed or database. This action may be preceded by a number of "navigation" operations to locate the task or program, as well as it may include a number of navigation operations to find the object on which the task is to be performed.

For example, if a trader wants to generate and review a two-year price-volume trend analysis and generate a related graph or chart, he may first have to "click" or navigate a menu structure to find the appropriate program or icon for the analysis task. After invoking the task, he must then select the block of data upon which the analysis is to be run, such as first selecting "DATA" then "IMPORT", and then navigating to find the appropriate database, setting input filter options, and then completing the data input process. Finally, the trader executes the analysis operation, specifying any options necessary, and gets the results and chart he needs to see.

This process is cumbersome most times, and can require a significant amount of time to conclude, which is critical during "live" trading sessions. Further, this process requires intimate knowledge of the computer system, where it's programs are located and how they are organized, and where or how to access each data source.

This "paradigm" of research, data access, and analysis is common to many other professions including purchasing agents, sales professionals, and technical support staff, all of whom find themselves overwhelmed by the amount of information through the Internet, and frustrated by the user interface of browsing, windowing, and program control.

Therefore, there is a need in the art for a system and method which reduces the information overload suffered by many professionals in research-intensive fields. Further, there is a need in the art for a system and method which allows the user to order and arrange the information in a manner which is conducive to his or her specific tasks and activities. Additionally, there is a need in the art for this system and method to provide an integrated user interface which enables a user to switch between tasks easily and quickly. Finally, there is a need in the art for this system to allow a user to receive and view retrieved information according to his or her specifically indicated interests, such as keywords, and to receive and review related information in a secondary priority which may also be of interest.

BRIEF DESCRIPTION OF THE DRAWINGS

The following detailed description when taken in conjunction with the figures presented herein provide a complete disclosure of the invention.

SUMMARY OF THE INVENTION

Figure 1:
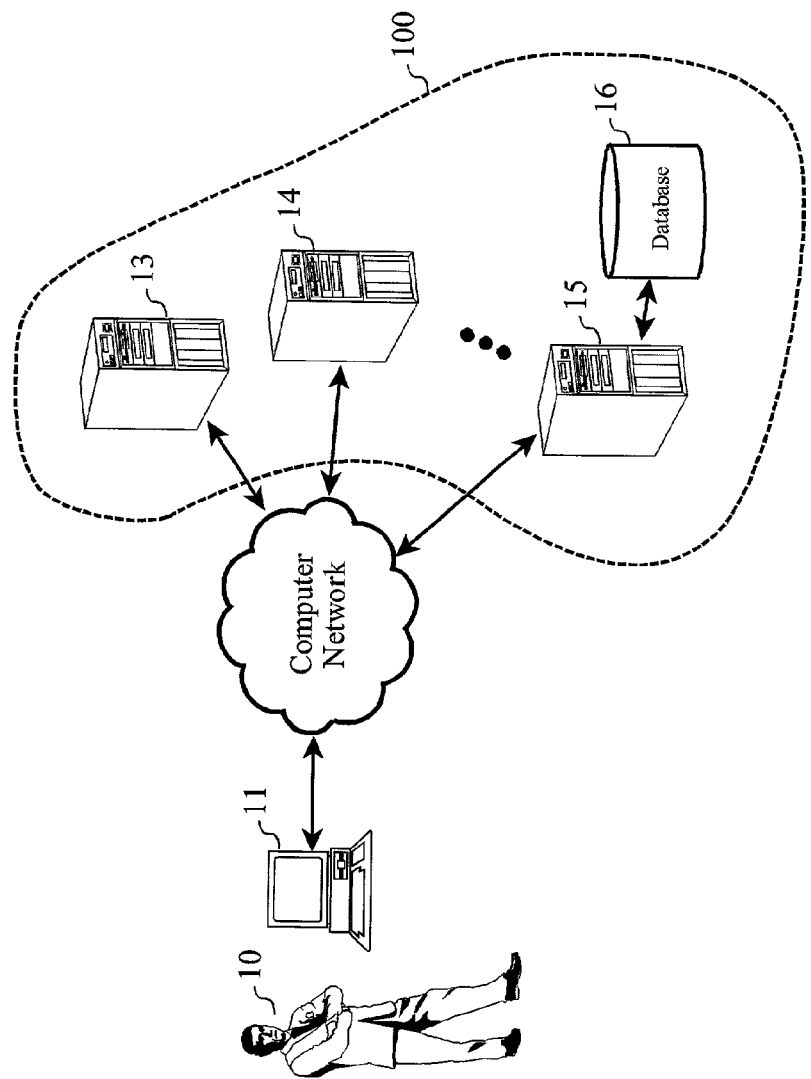
FIG. 1 illustrates the arrangement of systems for researching information according to the prior art.

The present invention provides an integrated approach to the aggregation and management of information from a variety of sources on a single web page. It allows selective "drill-down" by the user to obtain more detailed information, as desired. Because the user interface and operation paradigm matches the user's natural perspective and processes in that it focuses first on information objects and second on tasks to perform on those objects, it is intuitive and efficient to use.

The invention comprises a set of cooperating processes on a "Gatekeeper" server, and a set of client-side methods or programs running in cooperation with a user's web browser software. The client-side programs are preferably realized as JavaScript macros, but could alternatively be implemented using other well-known client-side software technologies (e.g. browser plug-ins, stand alone software, etc.).

The invention provides two "panes" within a single view: a Context Pane and a Content Pane. The Context Pane provides a plurality of tools and filter lists, while the Content Pane provides a number of Workspaces.

From the Context Pane, an informational object may be selected, and then an available task for that object may be executed. Semi-independent functionality modules provide information and task results for each Workspace in the Content Pane. The user interface (UI) is managed by the client-side JavaScript macros, each of which updates its respective areas of the user interface such as lists, icons, panes and workspaces.

The system is realized using a centralized processing method on a web server, which accesses a plurality of information sources and enables a number of functionality modules for a given user based on that user's profile and entitlements. The raw and processed information is prepared by the server, and transmitted to the user's web browser as common web page content.

Selections by the user within the Context Pane to conduct or execute entitled operations and tasks cause client-side macros to execute. Some operations only require local processing, such as the reformatting or sorting of data which is already present on the user's computer. In such a case, the JavaScript performs the action and updates the portion of the display as needed. In other cases, additional information or processing may be needed, such as getting a current quote for a selected financial instrument, in which case the client-side JavaScript will request processing from the Gatekeeper. The Gatekeeper then performs the requested actions and processing, returning the results and information to the client-side macro, followed by the macro performing the display or user interface update.

This process and method allows the user to configure the operations and data displayed in the panes to suit his or her goals and objectives, within the limitations of his or her entitlement schema. This arrangement also allows the user to be provided with apparently "custom" functionality and user interface while not requiring the user's browser computer to be equipped with highly specialized software but just a common web browser. Use of "applets", which have inherent drawbacks related to installation, setup, security, etc., are avoided in the preferred embodiment. Further, the invention provides for management of the web browser-based user interface that avoids screen "blanking" during updates of information.

DETAILED DESCRIPTION OF THE INVENTION

The present invention provides a summary of relevant information in an intuitive and easy to use format (e.g. user interface), incorporating information from various sources into a single webpage. Filtering is used to ensure that relevant and appropriate data is presented most prominently. User options are available to review results of a broader search, less specific search and collection in a less prominent manner.

In another feature of the present invention, user may customize the display of data and the presentation of data into a format that is conducive to his or her specific work habits and operations, and to set a level information summary to reduce information overload.

In a first aspect of the preferred embodiment, an "Object-Action" navigation ("OAN") model is adopted to replace the traditional "inverted L" navigation model. Our "Object-Action" navigation model is partly based upon the "Combined Object-Action Selection" paradigm described by Kelley and Ukelson in 1992.

According to our OAN, users obtain information they need by first addressing their attention to the objects of interest, such as listings on a computer screen user interface ("UI"). Then, the users specify what actions they wish to perform on those objects, such as a trader first selecting a company name from a list of companies on a computer screen, then selecting an action to get a quote for the company's stock. In another example, a trader may first select a company of interest, and then select an action to get the latest analyst commentary regarding that company. This approach is opposite in flow of the traditional paradigm, where a trader would first navigate to a web site where the action can be performed, such as navigating to a stock quote service, and then entering a company's ticker symbol to obtain a current stock quote.

The efficiency of the OAN model stems from the fact that a user is interested in the object (e.g. a particular company), and may want to exercise a number of views of and/or perform a variety and plurality of actions against that object throughout a work day.

FIG. 1 illustrates the arrangement of systems of the prior art. A user (10), such as a stock trader, uses a PC with a web browser (11) to access a plurality of web servers (100) or "web sites" (13, 14, 15) to obtain various bits of information from datafeeds and databases. Under this tradition model, in order for the user to get a stock quote, read press releases, obtain analyst's reports, and search the web in general for other possible interesting information about a particular company or financial instrument, the user performs the following actions:

(a) navigate to a stock quote service home page;
(b) enter the company's ticker symbol;
(c) receive the quote and save the data to local storage for later analysis;
(d) navigate to the company's home page;
(e) navigate to the company's investor relations page;
(f) print or save to disk the company's latest press releases;
(e) navigate to an analyst service home page;
(f) search for analyst reports from the analysis service;
(g) save or print the analysts' reports if any are found;
(i) navigate to a general purpose search engine;
(j) perform a search on a set of keywords including the company name, product names, etc.; and
(k) follow one or more "hits" or returns from the search engine results to review, print and/or save some of the interesting information.

In this process, the user has entered the company's name or ticker symbol at least four times, probably many more, which represents unnecessary repetition of tasks by the user and accounts for considerable time during a normal working day.

Under the OAN paradigm of the present invention, the user must simply:

(a) select the company of interest from a pre-configured list of companies and financial instruments, which causes the immediate effect of filtering or pre-populating the information modules in the Content Pane according to that selection;
(b) select "get quote" action, or use "point-and-click" navigation to see the pre-populated "quote" information module;
(c) select "get company news releases" action, or navigate to the "News Releases" module which has been filtered and sorted according to the selected company object; and
(d) select "get analyst reports" action, or navigate to the "Analysis Reports" module which has been filtered and sorted according to the selected company object.

In another aspect of the invention, a general search on keywords related to the "objects" available to the user is continuously or periodically executed, and the results of this "broader" search are presented in a less conspicuous manner to allow the user to get more information if desired.

By applying the OAN model to the present invention, the user is provided with a more efficient and intuitive method for repetitious tasks.

Figure 2:
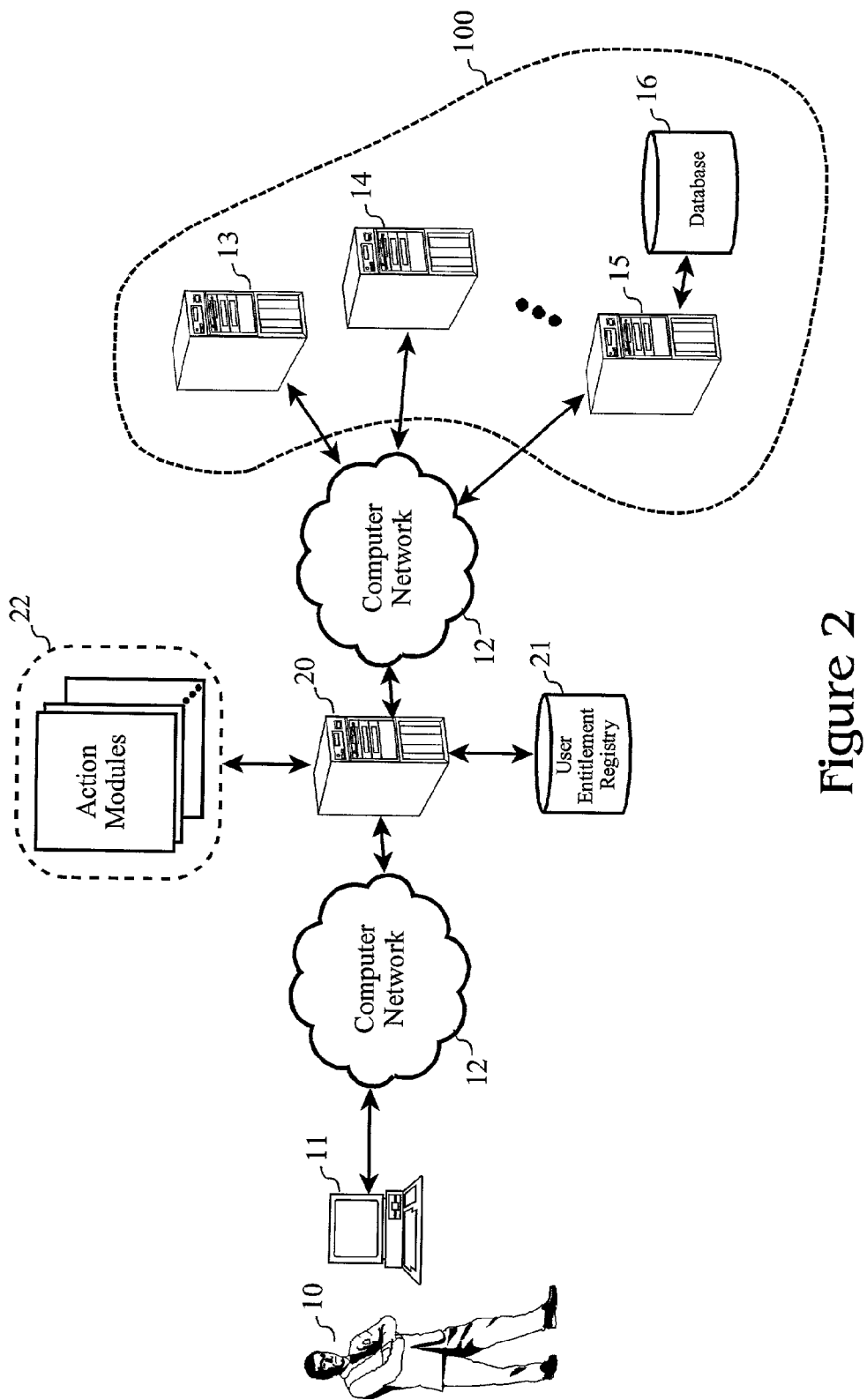
FIG. 2 sets forth the arrangement of systems according to the present invention.

Turning to FIG. 2, the arrangement of systems of the preferred embodiment is shown. The user (10) uses a PC with a web browser (11), which allows the user to access the invention through a well-known environment. The web browser client software proctors direct communications between client-side information modules and their various information sources (100), such as web servers for datafeeds and databases, supplying conforming search parameters for each source according to the user's selections in the Context Pane.

However, according to the preferred embodiment, a single Context selection is sent to a single "Gatekeeper" (20) server process which handles the various transactions and aggregates the returned information (with appropriate timeouts), and which returns the contents for the various information modules in one or more transactions to the web browser (11).

The Gatekeeper (20), then, directly polls and searches the set of information resources (100) according to a user profile and user entitlement registry (21). The user profile indicates which sources of information are of interest to the user (e.g. the "objects" of interest), and an user entitlement indicates which "actions" the user is allowed to perform on those objects based upon his or her service subscription terms.

A set of action modules (22) is also available to the gatekeeper (20). For our example of information management for a financial instrument trader, the action modules may include modules to:

(a) retrieve and format press releases from company web sites;
(b) retrieve current quotes;
(c) retrieve, chart and analyze historical data;
(d) retrieve analyst commentaries; and
(e) perform a general search using a list of keywords related to an object.

A particular trader may or may not be entitled to use all of these action modules, depending on his or her entitlement registry.

Upon initialization, the gatekeeper (20) accesses a user's profile and entitlement registry, loads the action modules to which the user is entitled, and obtains an initial data set from all of the information sources of interest to the user. This initial set of information may then be processed according to the loaded action modules, such as generating up-to-date historical chart.

Next, the gatekeeper prepares a web page containing this initial information, and transmits the page to the user's web browser (11) JavaScripts. As the gatekeeper prepares all of it's results and information in a common format such as Hyper Text Markup Language (HTML), the user's PC does not need to be equipped with any special software other than a common web browser software package with the associated JavaScript macros. No "applets" or local application software is required, apart from the JavaScript macros.

Figure 3:
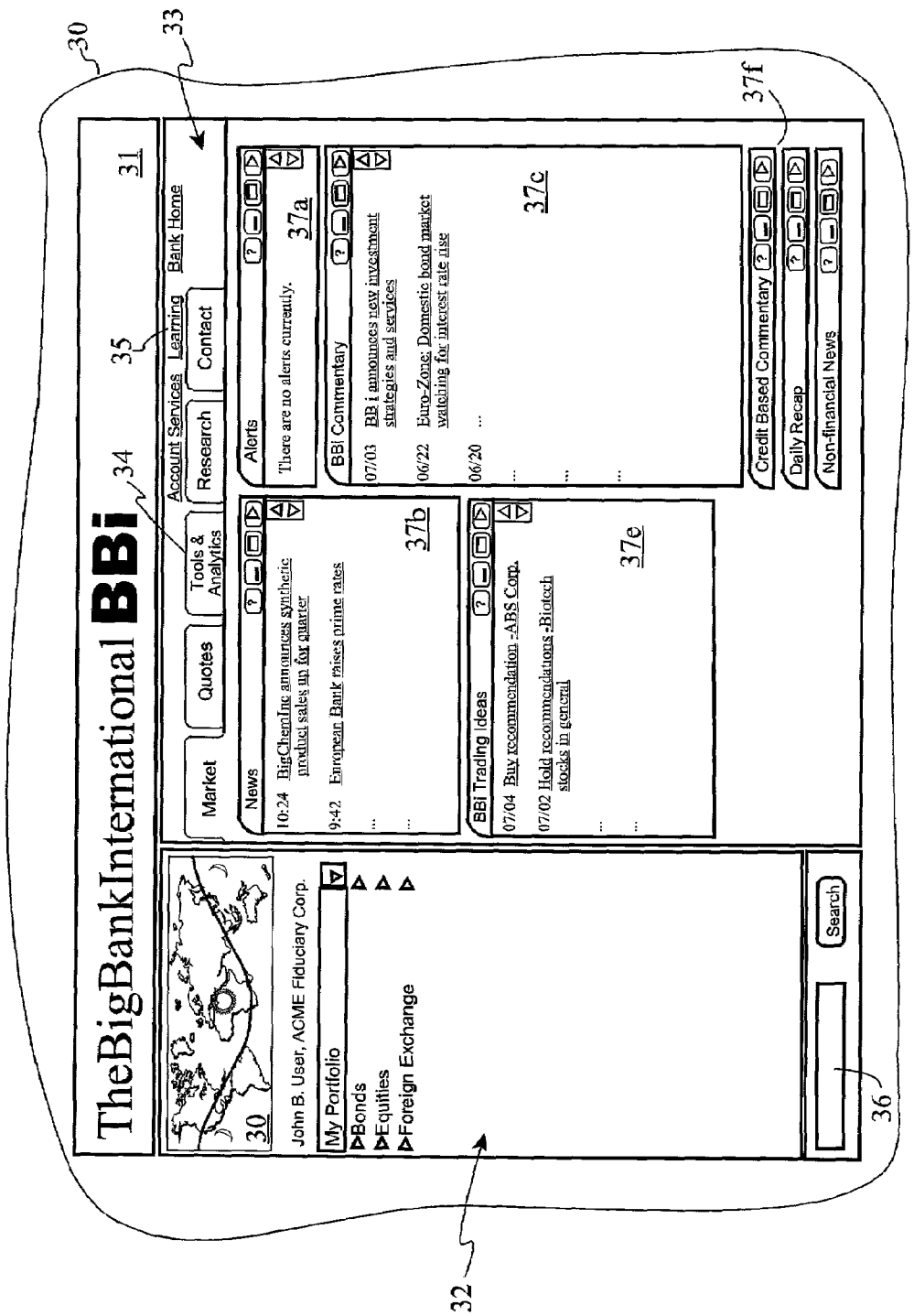
FIG. 3 shows an example web page user interface having a context pane and a content pane.

Turning to FIG. 3, an example initial web page is shown for a trader's user interface, shown on a portion (30) of the user's PC display. The page is divided into two "panes", a Context Pane (32) and a Content Pane (33). The Context Pane (32) contains an expandable and collapsible list of "objects" of interest according to the user's profile. In our trader example, the list of objects may include company names, products, financial instruments, etc.).

The Context Pane (33) contains a number of workspaces within which the results (37a, b, c, e, f) of several action modules are shown. According to the preferred embodiment, multiple workspaces may be organized and managed by the user by presenting a set of virtual folder tabs upon which each tab has a workspace title or name, such as "Market", "Quotes", "Tools & Analytics", "Research" and "Contact" in this example.

Each action module (or "query servlet") display "frame" (37), or "tool frame", preferably includes a set of icons which allows the display to be minimized, maximized, and contextual help to be invoked, such as the icons in the upper right corners of the action module displays (37) as shown. Further, up/down and right/left scrolling icons may be provided, as well.

So, the actions modules or "tools" the user may use are represented in a workspace in the Content Pane (33). At a glance, the user can see a useful portion of the information relevant to the objects of interest in several tools at one time. The user may expand or maximize a frame for a particular tool, as desired, and minimize others, in order to manage the display space effectively through the system's use.

According to the preferred embodiment, each icon selection (such as a maximize icon) or object and action selection causes an associated JavaScript macro to execute on the web browser, which may transmit a request and associated parameters as needed to the Gatekeeper system. The Gatekeeper system receives the request and parameter, performs the associated processing (e.g. search or information retrieval), and returns the results to the JavaScript in the form of HTML content. The client-side JavaScript then updates the appropriate portions, panes, frames and/or workspaces within the user interface in the web browser.

The Content Pane (33) also preferably includes a banner or logo area (31) which allows the providing company to show its name and logo to the user.

Further, the automatic display of the information (e.g. action module frames) in the Content Pane (33) is filtered and sorted according to the user's interest level in an object. For example, if a user clicked on "IBM" in the object list of the Context Pane, the results of the news headline information module would be sorted to place those headlines specifically about IBM at the top or head of the results list, and other headlines regarding related subjects such as computer and technology equities would be placed towards the end of the results list. In addition, the "Quotes" transactional information module (which may exist on another workspace tab) may be pre-populated with all the quote information about "IBM".

According to the user's profile, the filter/sort process on the Gatekeeper can determine which action modules to load, which objects to place in the Context Pane, and how to initially display the action module frames in the Content Pane. The profile can also record the user's deletions of tools, relocation of tools (within a workspace or from one workspace to another), sizing of action module frames in the Content Pane, as well as reorganization of the objects in the Context Pane. This allows users who rely on the system intimately and intensively to tailor the user interface and display space allocation to his or her best advantage.

Turning our attention to the Context Pane, it preferably contains a GeoMap (30), an Object List and an Object Finder. The purpose and use of the Context Pane is to allow the user to examine objects (e.g. companies, financial instruments, geographies, markets, etc.) and, by expressing interest (e.g. selecting) in an object, causing the contents of the action module frames in the Context Pane to be populated or refreshed in information and process results.

The user is provided with editing capabilities to add or delete objects from the object list, which results in the user's profile on the Gatekeeper being updated accordingly. Similarly, the user is provided controls to categorize or group objects, such as creating a group "Bonds" and placing a number of bond objects within this group. Groups or categories can be expanded or collapsed using icons, such as the right arrow head icon to the left of the group headings "Bonds", "Equities", and "Foreign Exchange" in FIG. 3.

When objects or category headers are selected in the Context Pane, the associated web browser JavaScript macro is executed. If the requested information is already available in the appropriate tool frame in the Content Pane, then the JavaScript macro will simply highlight the information, bring it to the top of the layers and workspaces in the display, and filter/sort it if necessary. If the information is not currently available locally to the web browser, the JavaScript may contact the Gatekeeper to obtain the information, which after its receipt, will be formatted and displayed in the relevant tool frame(s). This process of updating only the affected tool frames allows avoids the need to completely reload the web page in the web browser, which results in an undesirable blanking of the browser display during reload.

Further according to the preferred embodiment, the user may use a "control" or "alt" key and click on several objects to select more than one object. This may cause a JavaScript macro to be executed with multiple criteria or parameters, such as a multiple-parameter search or filter.

In response to receiving a request for information from a client-side JavaScript macro, the Gatekeeper also executes or runs each loaded action module such that the Content Pane may be populated with relevant information regarding the selected object. While action modules are executing and processing, their respective action module frames in the Content Pane may simply say "Loading . . . " or display an hourglass icon (or similar wait-while-processing icon). When the results are posted to the action module frame, if their length exceeds the display area of the frame, and ellipsis (" . . . ") may be shown to indicate there is more information to be viewed by maximizing the frame or scrolling the frame.

Figure 4:
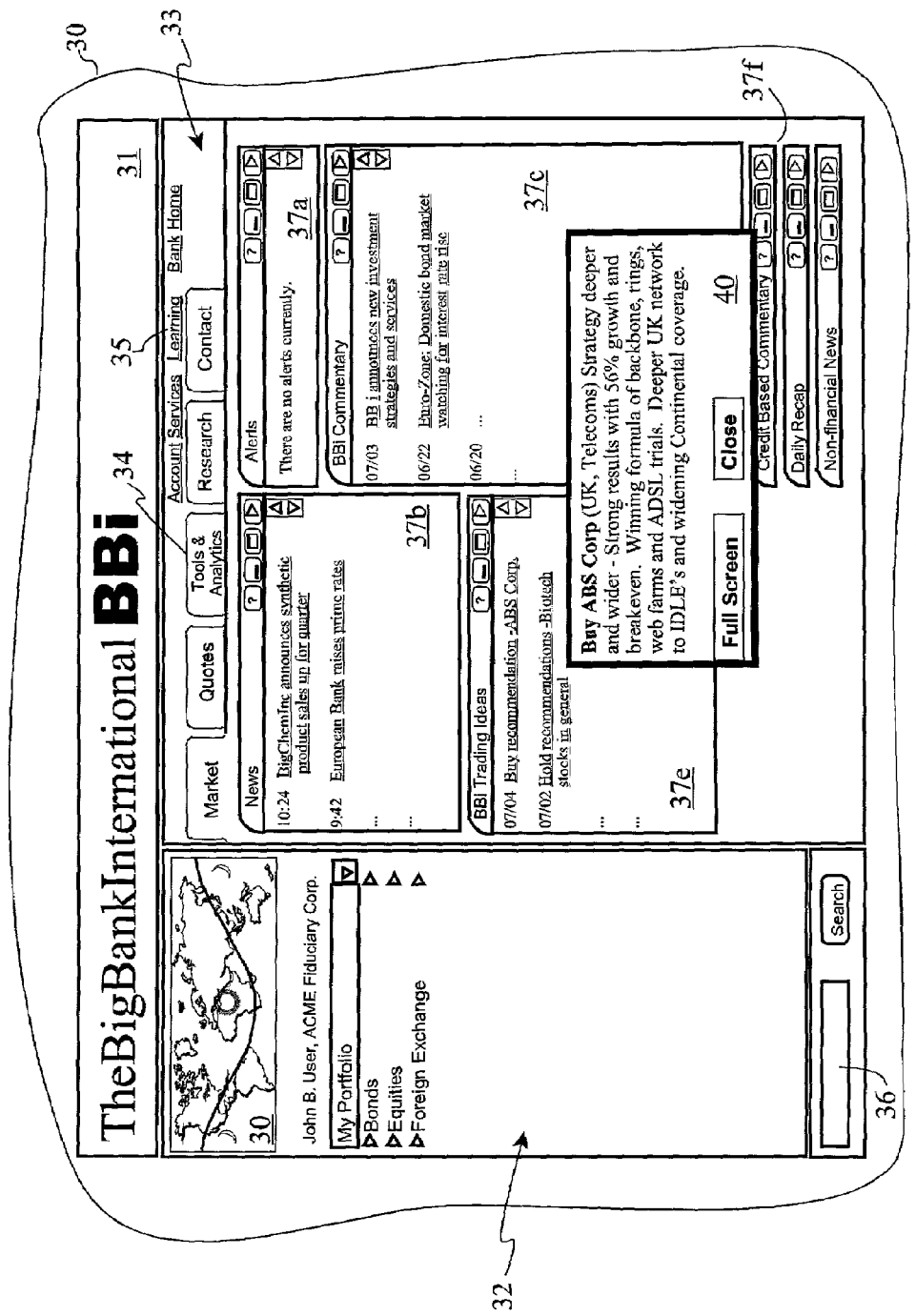
FIG. 4 illustrates a pop-up information frame for user-selected objects.

Turning to FIG. 4, an example of a pop-up display (40) is shown which is provided in response to the user selecting (e.g. clicking on) an item within an action module frame, such as the buy recommendation in action module frame 37*e* of this example.

Figure 5:
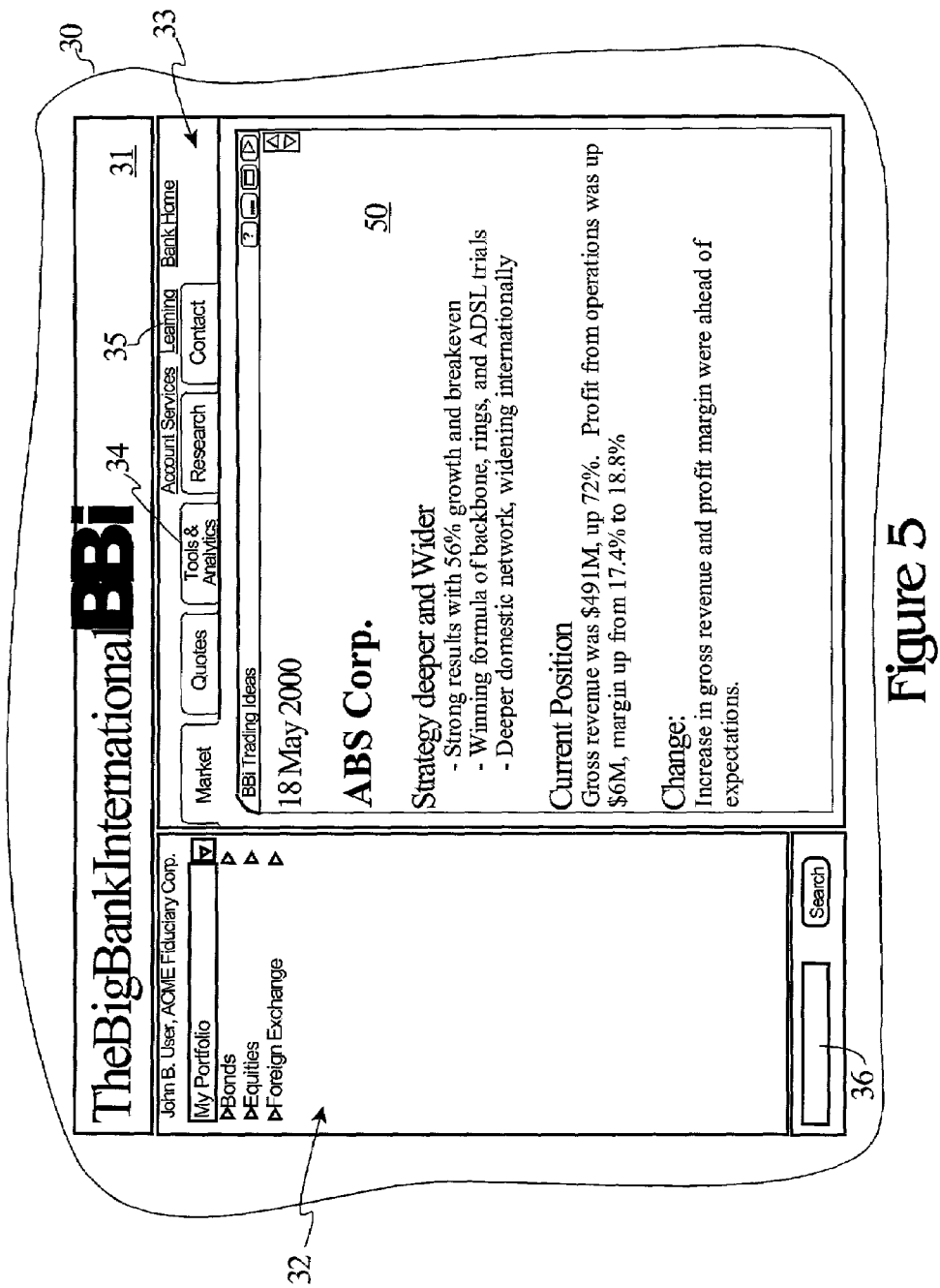
FIG. 5 shows an example of a full-page or maximized action module frame.

Further according to the preferred embodiment, the selected information can be maximized (50) to consume the fall area of the Content Pane, as shown in FIG. 5.

Figure 6:
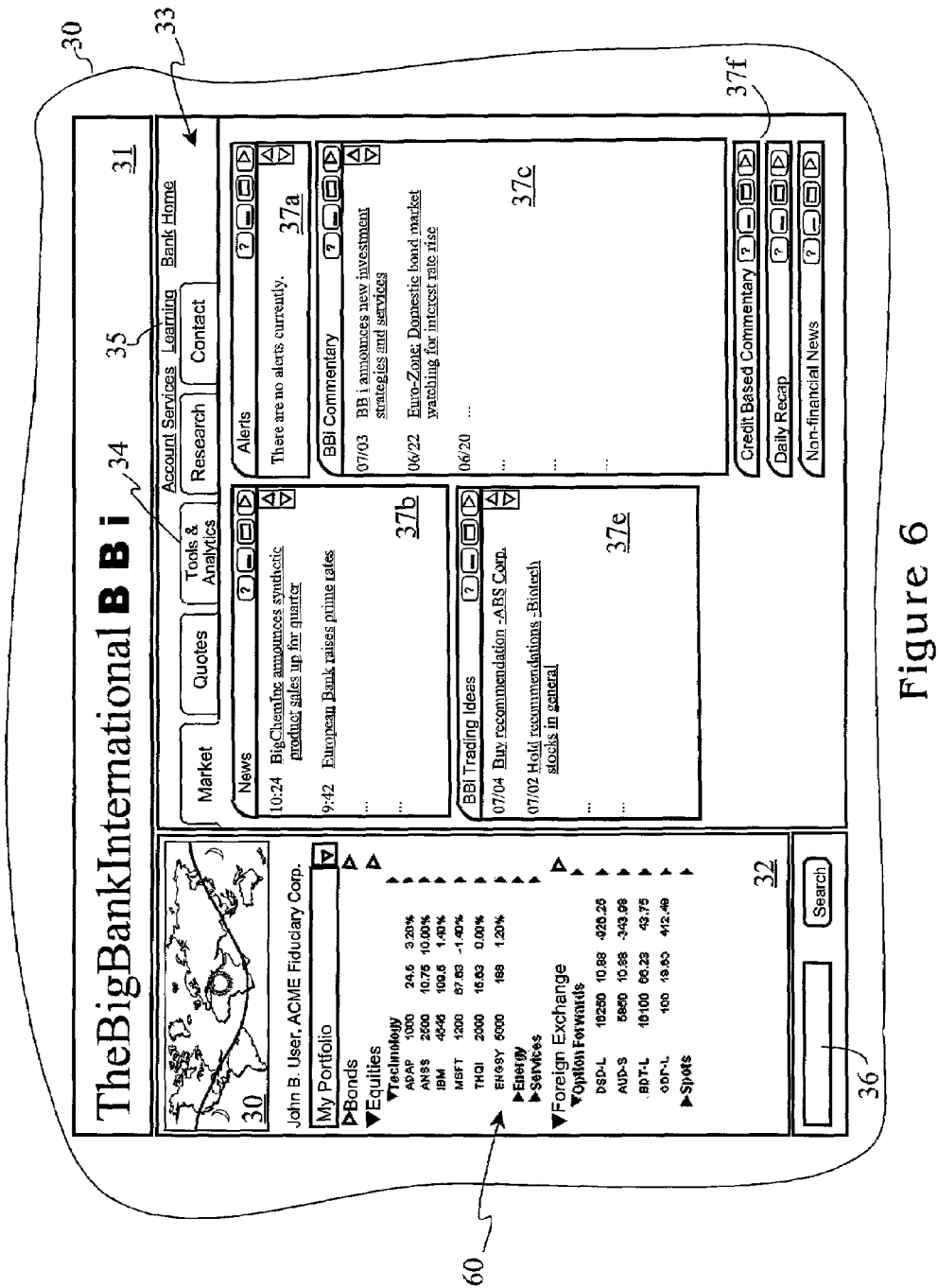
FIG. 6 demonstrates the expansion and collapsing functionality of context pane's object list.

Turning to FIG. 6, the object list in the Context Pane (32) can be manipulated and managed by the user by expanding and collapsing each category header so that only the currently interesting objects are listed. For example, during a particular trading session in which equities are active and the foreign exchange markets are volatile, the user may expand the equities object group and the foreign exchange object group to show all the objects within those groups.

Figure 7:
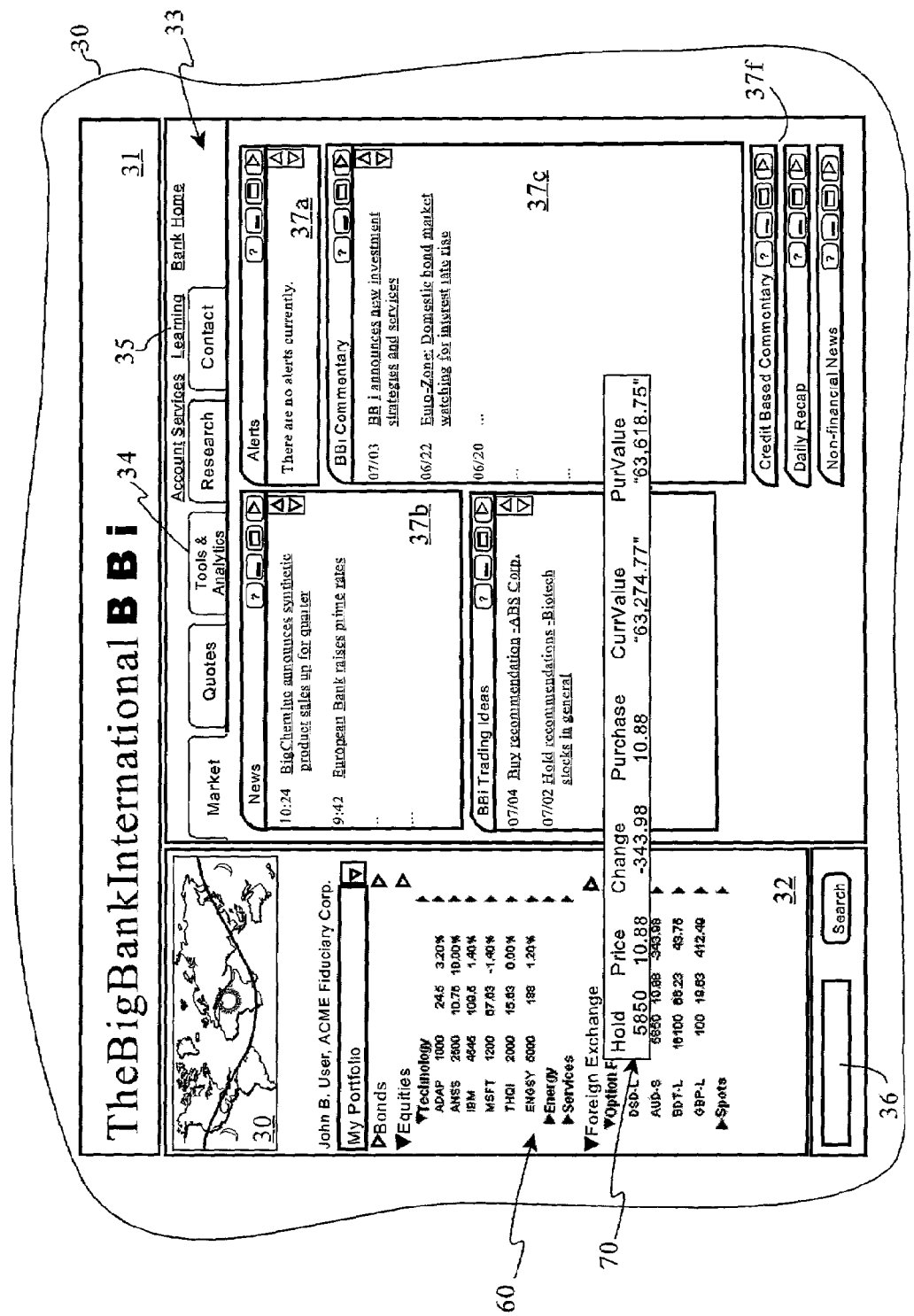
FIG. 7 shows an example of roll-over pop-up information display.

As shown in FIG. 7, the preferred embodiment also provides a "roll-over" action which, when the user moves a pointer over an object in the Context pane, causes a longquote pop-up (70) to be thrown across the screen. Again, under this paradigm, the roll-over event is detected by a client-side JavaScript, which then displays the long-quote pop-up on top of the two panes. And, if necessary, the JavaScript may contact the Gatekeeper to get details for the pop-up display.

Figure 8:
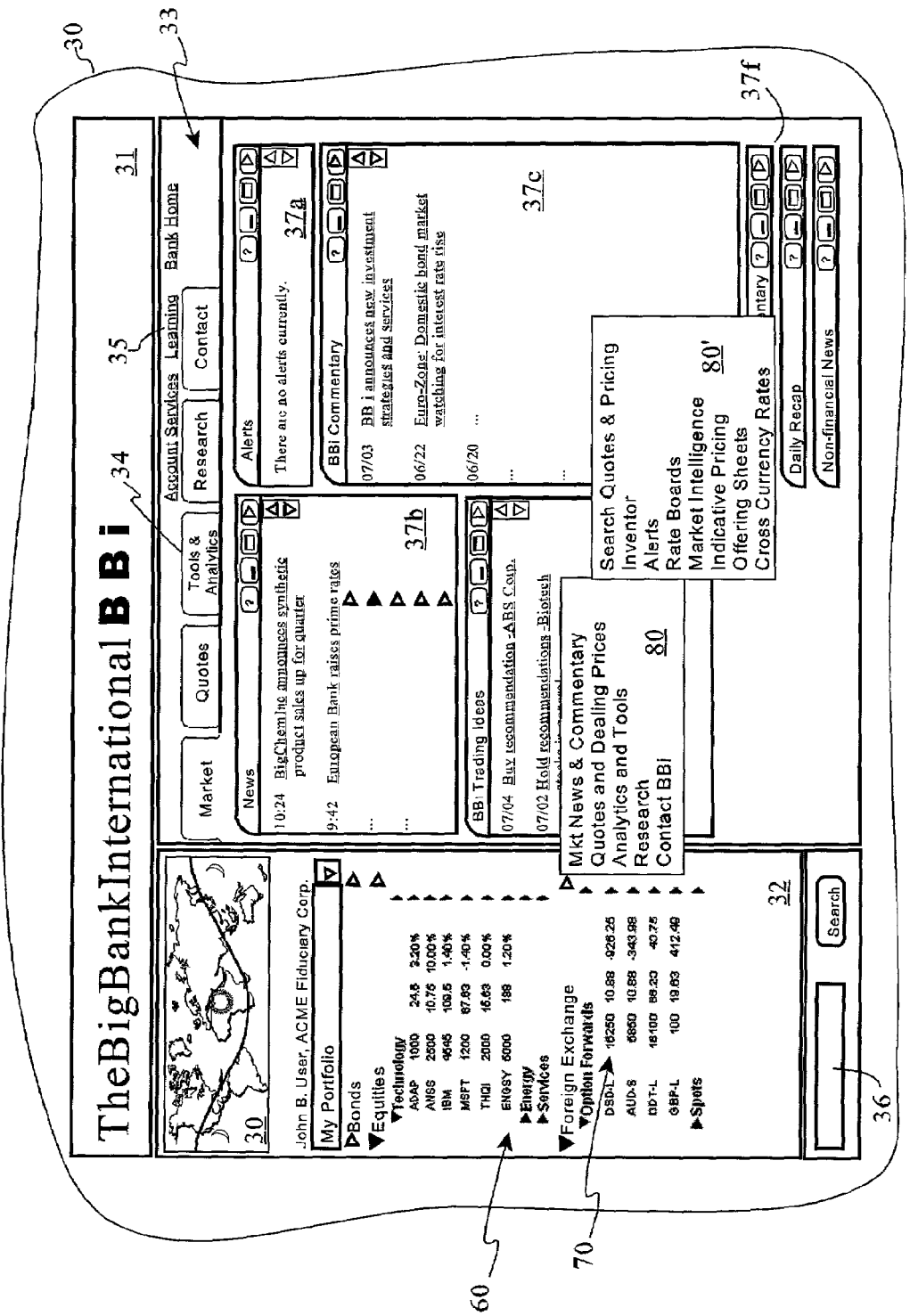
FIG. 8 illustrates the display of available actions for a selected object.

Turning to FIG. 8, the process of selecting an action to perform on an object is illustrated. The action icons, shown here as the right-facing arrow head icon to the right of objects in the object list of the Context Pane (32), can be selected by the user, which causes a pop-up action list (80) of available actions or tools for that object. The user can then select an action to perform on the object, which causes the action module to be executed by the Gatekeeper and the appropriate action module frame to be updated or repopulated with information in the Content Pane (33). According to the preferred embodiment, the action list may be cascading (81), as well, which allows grouping and categorization of related actions.

Further according to the preferred embodiment, an object finder (36) is provided for the user to search for objects based upon keywords, which may then be added to the object list if desired.

Also according to the preferred embodiment, a GeoMap (30) is displayed somewhere on the web page, which represents a map of the globe with an indication of night and day across the map. In addition, information about various geographic areas could be displayed, such as which markets are currently open and time-till-opening-bell indicators.

The GeoMap is responsive to user clicks within the map over certain regions, which allows the user to indicate geographic filter criteria to be applied during the filter and sort actions. For example, a user may select the Asia continent in order to filter and sort the bond information displayed in the action module frames.

Figure 9:
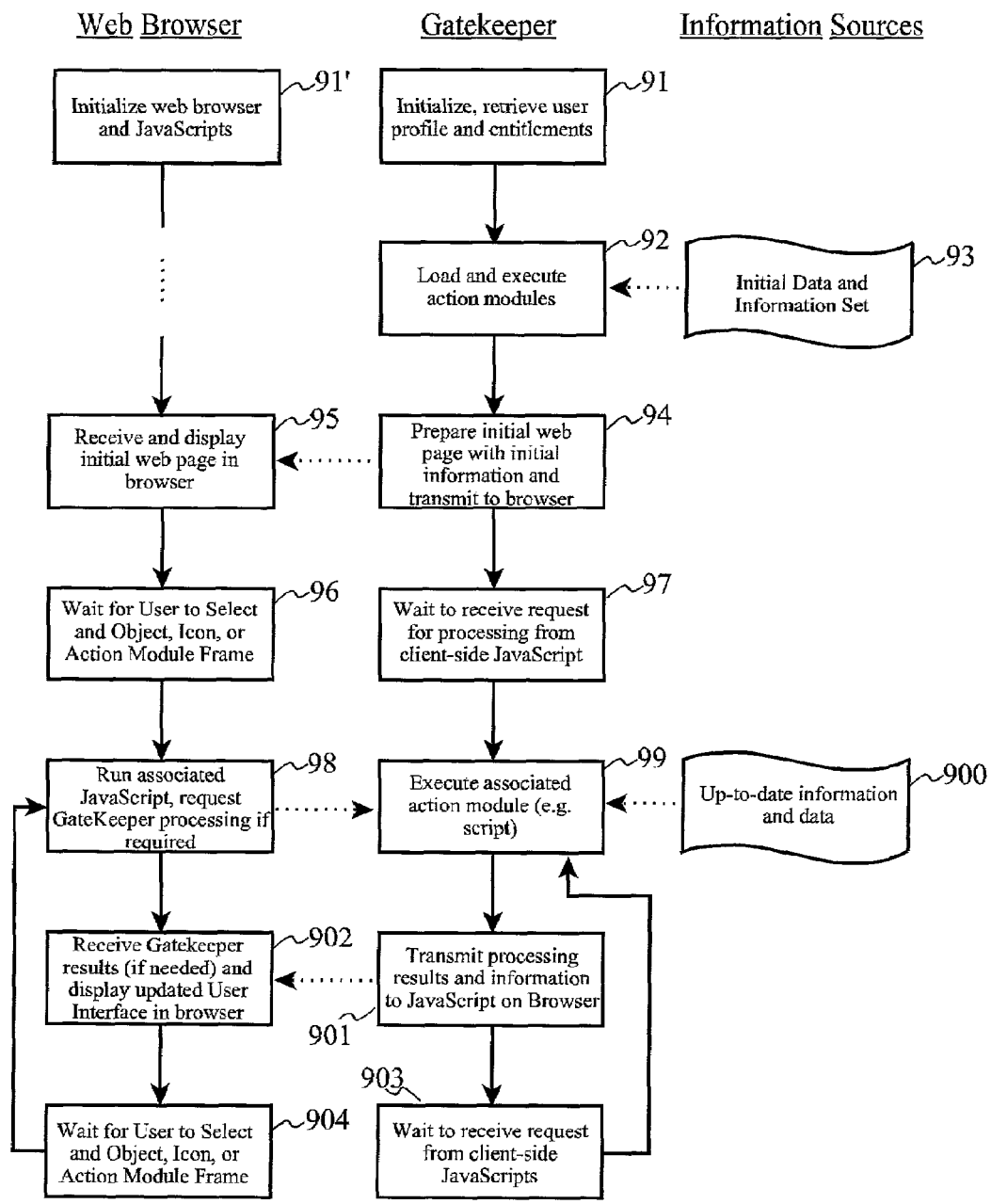
FIG. 9 sets forth the logical process of the invention.

Turning to FIG. 9, the logical process of the invention is disclosed, which includes cooperative actions between the Gatekeeper and the set of JavaScripts running on the browser.

First, the Gatekeeper system initializes (91) for a particular user by retrieving the user's profile and entitlement, and the web browser initializes (91'). The action modules to which the user is entitled are then loaded and executed (92), which causes an initial data and information set (93) to be retrieved from the networked information sources.

Then, according to the user's profile, and initial web page is generated (94) combining the initial data set and information (94) into the aforementioned two-pane display, including an object list and one or more action module frames in one or more workspaces having an overall layout definition. The information is preferably filtered and sorted according to the user's indicated interests, as previously described. The initial web page is transmitted to the user's web browser, where it is received and displayed (95) by the JavaScripts on the user's PC display in the appropriate panes, frames and workspaces in the web browser window.

Until the user selects a link (e.g. an icon, object, workspace tab, GeoMap region, item in a action module frame, etc.) in the web browser display, both the Gatekeeper and the client-side JavaScripts wait (96, 97).

When the user selects (98) an icon or link in either of the panes, the associated JavaScript macro is executed. In some cases, such as selection of a "maximize display" icon, this may only result in the JavaScript expanding the relevant tool frame to display all information available. In other cases, the user's selection may require additional information from the Gatekeeper, such as selection of a "Get Current Quote" action on an object, which will result in the associated JavaScript requesting a new quote from the Gatekeeper. If a request for processing is sent to the Gatekeeper, the appropriate action module is executed (99) with retrieval or access of any necessary information (900), and the results are transmitted (901) back to the requesting JavaScript.

Next, the associated pane, list, and/or tool frame on the web browser display is/are reformatted or updated (902) by the JavaScript to include the up-to-date data or other Gatekeeper results, with any necessary filtering and sorting being done.

Then, the Gatekeeper and the web browser JavaScript macros again wait (903, 904) for another user selection of an icon or list item in the displayed web page.

While certain details of a preferred embodiment have been disclosed, and certain examples have been given to illustrate the invention in a more understandable manner, it will be recognized by those skilled in the art that the spirit and scope of the present invention is not limited to these examples and embodiment details. The invention may be employed for a wide range of information gathering and display applications beyond that related to stock and financial market trading, and alternate programming methodologies and user interface techniques may be employed without departing from the spirit and scope of the invention. Therefore, the scope of the present invention should be determined by the following claims.

What is claimed is:

1. A computer-implemented method for searching interest objects, the method comprising:

providing a plurality of controls and displays in a single web page, the controls and displays being interrelated by an Object-Action Navigation model which a user obtains desired information by first addressing user's attention to one or more displayed objects of interest, the user subsequently specifying one or more search aggregation actions that is performed on addressed objects, the Object-Action Navigation model being opposite in operational flow of an Action-Object model which a user initially navigates to a web page, wherein the interest objects comprises a company name, a product name, a tradable security identifier or a person's name;

displaying, by using a computer, to the user a plurality of user-selectable interest objects in a prominently viewable Context Pane portion of the single web page according to a user interest profile;

firstly selecting an interest object of the plurality of user-selectable interest objects which the user wishes a desired action to be performed;

responsive to the user the selecting the interest object in the prominently viewable Context Pane portion, filtering aggregated information from various sources, generating a set of results, wherein the set of results is aggregated from a plurality of semi-independent heterogeneous information modules, and displaying a plurality of available aggregation actions for performance on the selected interest object, the plurality of available aggregation actions being defined and limited by a user entitlement registry, wherein the plurality of available aggregation actions comprises retrieving a real-time market trade quote for the selected interest object;

responsive to the user secondly selecting the available aggregation actions, automatically sending the selected interest object and the selected available aggregation actions to a gateway server;

loading and executing one or more action modules by the gateway server to perform the selected available aggregation actions on the selected interest object;

displaying results from the execution of the selected available aggregation actions in a prominently displayed Content Portion of the single web page, wherein reloading and blanking the single web page in a web browser are avoided by updating only affected tool frames in the single web page;

automatically executing a broader search using keywords related to the displayed objects of interest, the broader search being executed periodically to produce broad search results;

responsive to a user command, sorting the broad search results according to user's interest as indicated by a most recent selection;

displaying the broader search results to the user in display less prominent than the display of the viewable Context Pane portion and the Content Portion, the less prominent display being selected from a group consisting of a minimized workspace, a minimized frame, and an expandable pop-up box; and providing to the user a plurality of options to review the sorted broad search results.

2. The method as set forth in claim 1 wherein said plurality of available aggregation actions comprises a performing a search for news on a selected interest object.

3. The method as set forth in claim 1 wherein said plurality of available aggregation actions comprises retrieving an analyst report regarding said selected interest object.

4. The method as set forth in claim 1 wherein said plurality of available aggregation actions comprises retrieving a historical market trade report regarding said selected interest object.

5. The method as set forth in claim 1 wherein said plurality of available aggregation actions comprises retrieving a quarterly company report for said selected interest object.

6. The method as set forth claim 1 wherein said plurality of available aggregation actions comprises retrieving an annual company report for said selected interest object.

* * * * *